(12) United States Patent
Hecht

(10) Patent No.: US 8,740,511 B2
(45) Date of Patent: Jun. 3, 2014

(54) TOOL HOLDER AND METHOD FOR CLAMPING A CUTTING INSERT THEREIN

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 213 days.

(21) Appl. No.: 13/412,858

(22) Filed: Mar. 6, 2012

(65) Prior Publication Data
US 2013/0149054 A1 Jun. 13, 2013

Related U.S. Application Data

(60) Provisional application No. 61/568,532, filed on Dec. 8, 2011.

(51) Int. Cl.
*B23B 27/16* (2006.01)

(52) U.S. Cl.
USPC .......................... 407/107; 407/110; 407/117

(58) Field of Classification Search
USPC ................... 407/107, 91, 109, 110, 111, 117; 403/62, 374.3
See application file for complete search history.

(56) References Cited

U.S. PATENT DOCUMENTS

| | | | | |
|---|---|---|---|---|
| 2,687,563 A | * | 8/1954 | Bader | 407/69 |
| 3,672,710 A | * | 6/1972 | Kroopp | 403/252 |
| 4,533,283 A | * | 8/1985 | Satran et al. | 407/111 |
| 4,641,983 A | * | 2/1987 | Strassle | 403/12 |
| 5,360,298 A | | 11/1994 | Hedlund | |
| 5,921,724 A | * | 7/1999 | Erickson et al. | 407/117 |
| 6,139,227 A | * | 10/2000 | Schafer et al. | 407/110 |
| 6,379,087 B1 | * | 4/2002 | Alexander, IV | 407/107 |
| 6,814,526 B2 | * | 11/2004 | Shiraiwa et al. | 407/110 |
| 8,491,232 B2 | * | 7/2013 | Schaefer | 407/110 |
| 2004/0101373 A1 | * | 5/2004 | Isaksson et al. | 407/103 |

FOREIGN PATENT DOCUMENTS

| | | | |
|---|---|---|---|
| EP | 450542 A1 | * | 10/1991 |
| EP | 2110192 A1 | * | 10/2009 |
| FR | 2347135 A | * | 12/1977 |

* cited by examiner

*Primary Examiner* — Daniel Howell
*Assistant Examiner* — Nicole N Ramos
(74) *Attorney, Agent, or Firm* — Womble Carlyle Sandridge & Rice, LLP

(57) ABSTRACT

A tool holder has a main body having a holder head extending away from a holder shank in a forward direction, a clamping member non-threadingly retained in the holder head, and a locking member operatively engaging a single abutment surface of the clamping member. The holder head has an insert receiving pocket at a forward end thereof with a pocket support surface substantially facing in an upward direction, and the clamping member is located entirely rearward of the pocket support surface with the abutment surface facing generally upwardly. The tool holder is configured to direct a clamping force towards, and clamp a cutting insert against, the pocket support surface.

29 Claims, 4 Drawing Sheets

TOOL HOLDER AND METHOD FOR CLAMPING A CUTTING INSERT THEREIN

RELATED APPLICATIONS

This application claims priority to U.S. Provisional Patent Application No. 61/568,532, filed 8 Dec. 2011, whose contents are incorporated by reference in their entirety.

FIELD OF THE INVENTION

The present invention relates to a tool holder for use in metal cutting processes in general, and for grooving, turning and parting operations in particular.

BACKGROUND OF THE INVENTION

Within the field of tool holders used in grooving, turning and parting operations there are many examples of cutting inserts being clamped in an insert receiving pocket of a tool holder having an upper pocket clamping surface and a lower pocket support surface. Some of these tool holders are configured such that a clamping force is actively applied to clamp the cutting insert between the upper pocket clamping surface and the lower pocket support surface.

U.S. Pat. No. 5,360,298 discloses such a tool holder, having a clamping member in the form of a clamping screw. The clamping screw passes through a through bore in an upper part of the tool holder associated with the upper pocket clamping surface, bisects a clamping slot extending rearwardly from the insert receiving pocket, and engages a threaded bore in a lower part of the tool holder associated with the lower pocket support surface. The clamping screw is tightened in order to clamp the cutting insert in the insert receiving pocket.

U.S. Pat. No. 6,814,526 also discloses such a tool holder, having a clamping member in the form of a drawbar and a locking member in the form of a locking screw. The drawbar comprises a head and a shaft, the shaft having a threaded end portion distal from the head. The shaft bisects a clamping slot extending rearwardly from the insert receiving pocket and is threadingly retained in an upper part of the tool holder associated with the upper pocket clamping surface. The head is located in a lower part of the tool holder associated with the lower pocket support surface, and the locking screw operatively engages the head to clamp the cutting insert in the insert receiving pocket.

U.S. Pat. No. 6,139,227 also discloses such a holder, having a clamping member in the form of a transmission pin and a locking member is in the form of an eccentric cam. The transmission pin is slidably retained in a first bore in a lower part of the tool holder associated with the lower pocket support surface. The first bore intersects a clamping slot located rearward of the insert receiving pocket, above which is situated an upper part of the tool holder associated with the upper pocket clamping surface. The eccentric cam is located in a second bore transverse to the first bore in the lower part of the tool holder, and operatively engages the transmission pin to clamp the cutting insert in the insert receiving pocket.

It is an object of the present invention to provide an improved tool holder.

It is also an object of the present invention to provide a tool holder having a locking screw accessible from at least one lateral surface.

It is a further object of the present invention to provide a tool holder with optimal transmission of a clamping force and efficient active clamping of a cutting insert.

It is yet a further object of the present invention to provide a tool holder with an advantageously high level of cutting insert clamping repeatability.

SUMMARY OF THE INVENTION

In accordance with the present invention, there is provided a tool holder comprising:
a main body having a holder head extending away from a holder shank in a forward direction, the holder head having an insert receiving pocket at a forward end thereof, with a pocket support surface substantially facing in an upward direction;
a clamping member non-threadingly retained in the holder head and located entirely rearward of the pocket support surface; and
a locking member operatively engaging a single abutment surface of the clamping member,
wherein the abutment surface faces generally upwardly, and
wherein the tool holder is configured to direct a clamping force towards, and clamp a cutting insert against, the pocket support surface.

Also in accordance with the present invention, there is provided a method of clamping a cutting insert in a tool holder, the tool holder comprising:
a main body having a holder head extending away from a holder shank in a forward direction, the holder head having an insert receiving pocket at a forward end thereof, with a pocket support surface substantially facing in an upward direction;
a clamping member non-threadingly retained in the holder head; and
a locking member operatively engaging a single abutment surface of the clamping member, wherein the abutment surface faces generally upwardly,
the cutting insert having opposing first and second insert surfaces with an operative cutting edge associated with the first insert surface,
the method comprising the steps of:
positioning the cutting insert adjacent the forward end of the holder head with a portion of the second insert surface in contact with the pocket support surface,
sliding the cutting insert in a rearward direction into the insert receiving pocket, and
actuating the locking member until a clamping force is applied between the second insert surface and the pocket support surface.

Further in accordance with the present invention, there is provided a cutting tool comprising a tool holder and a cutting insert removably secured in the tool holder,
the tool holder comprising:
a main body having a holder head extending away from a holder shank in a forward direction, the holder head having an insert receiving pocket at a forward end thereof, with a pocket support surface substantially facing in an upward direction;
a clamping member non-threadingly retained in the holder head and located entirely rearward of the pocket support surface; and
a locking member operatively engaging a single abutment surface of the clamping member,
the cutting insert having opposing first and second insert surfaces with an operative cutting edge associated with the first insert surface,
wherein the second insert surface makes clamping contact with the pocket support surface, and
wherein the abutment surface faces generally upwardly.

Still further in accordance with the present invention, there is provided a tool holder assembly comprising:

a main body having a holder head extending away from a holder shank in a forward direction, the holder head having a top surface, at least one lateral surface having a locking bore formed therein, and an insert receiving pocket at a forward end thereof, the insert receiving pocket comprising a pocket support surface and an opposing pocket clamping surface;

a clamping member configured to be received into the holder head and located entirely rearward of the pocket support surface, the clamping member having an abutment surface; and a locking member configured to be received into the locking bore formed in the holder head's lateral surface and engage the clamping member's abutment surface to thereby apply an abutment force which urges the pocket clamping surface in a direction of the pocket support surface, when the clamping member is received in the holder head's top surface and non-threadingly retained in the holder head by said locking member.

A cutting tool in accordance with the present invention may thus comprise the aforementioned tool holder assembly and a cutting insert clampingly retained in the insert receiving pocket between the pocket support surface and the pocket clamping surface, wherein:

the clamping member is non-threadingly retained in the holder head and the locking member occupies the locking bore and engages the clamping member's abutment surface to thereby apply the aforementioned abutment force.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
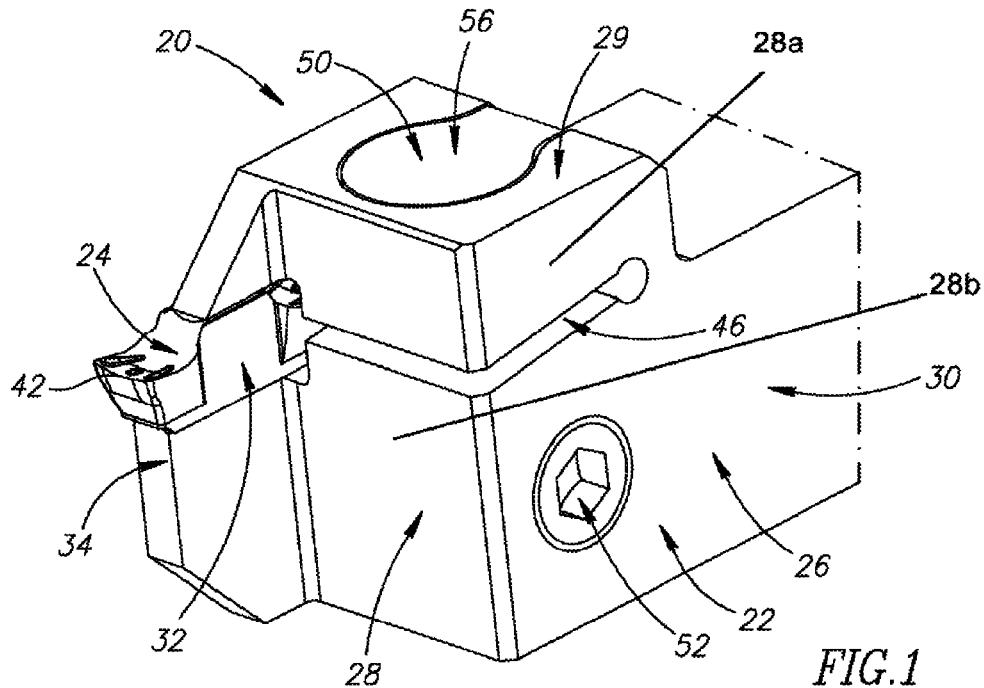
FIG. 1 is a perspective view of a cutting tool in accordance with some embodiments of the present invention.
Figure 2:
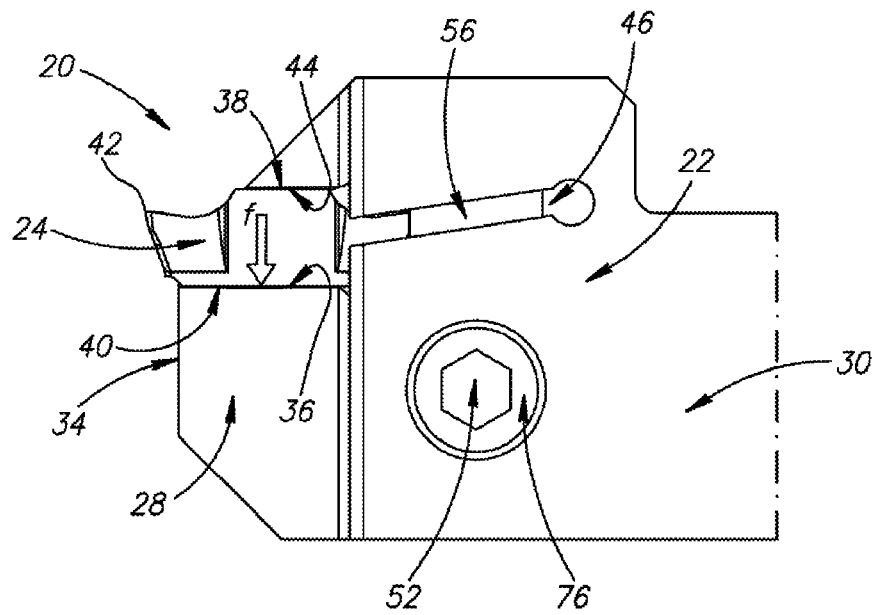
FIG. 2 is a side view of the cutting tool shown in FIG. 1.

Attention is first drawn to FIGS. 1 and 2, showing a cutting tool 20 in accordance with some embodiments of the present invention. The cutting tool 20 comprises a tool holder 22 and a cutting insert 24 removably secured in the tool holder 22.

Figure 3:
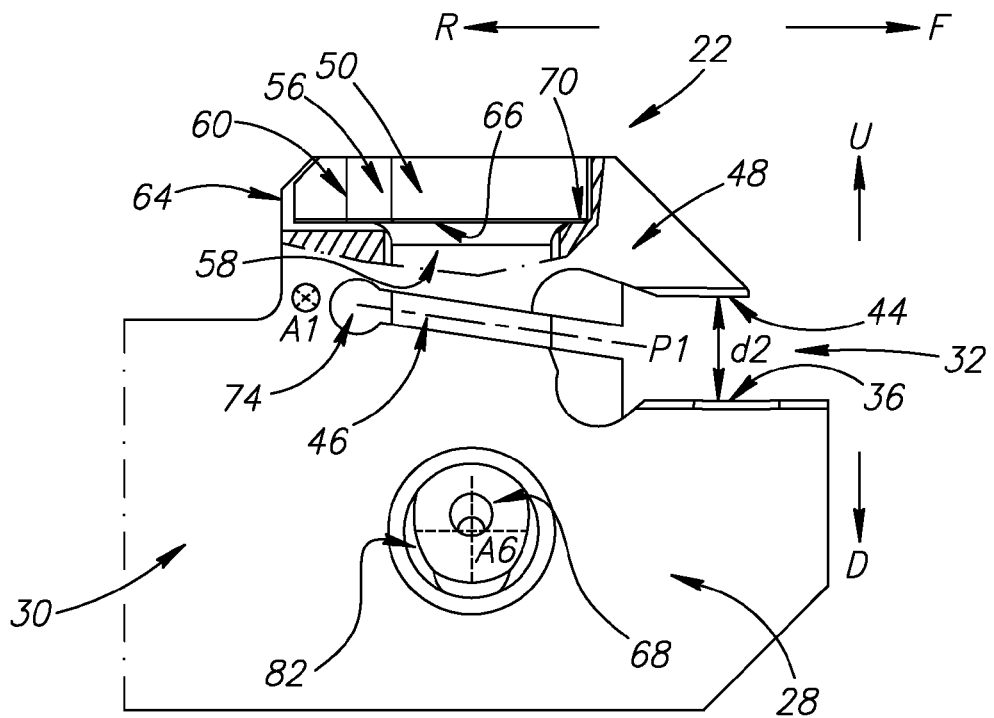
FIG. 3 is a side view of a tool holder in accordance with some embodiments of the present invention.
Figure 4:
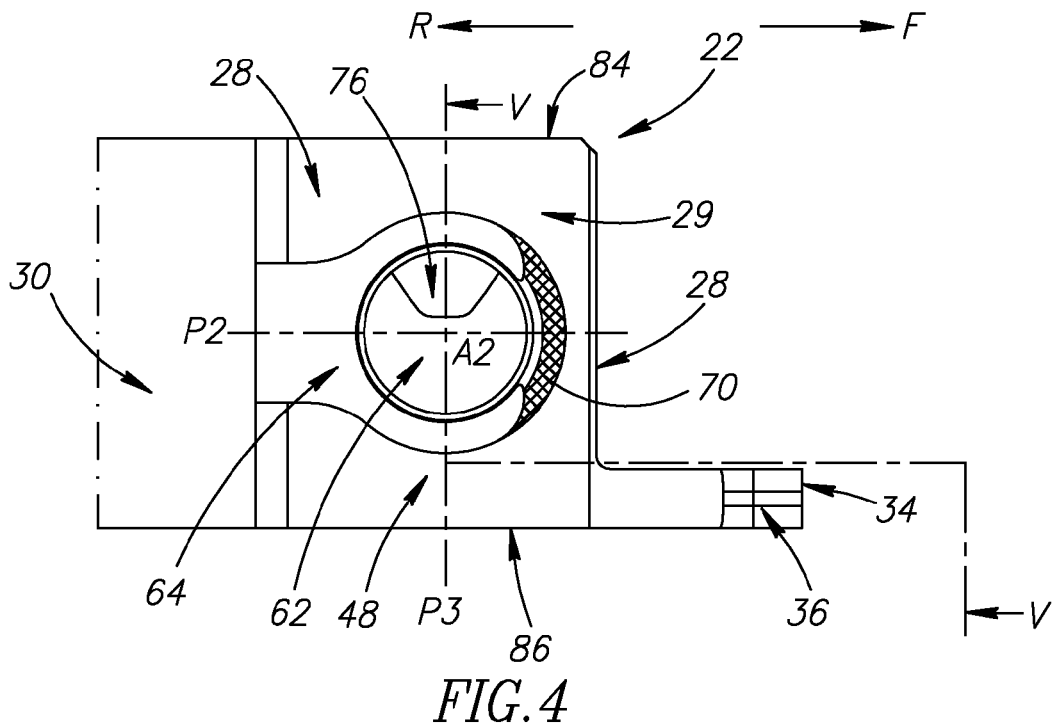
FIG. 4 is a top view of the tool holder shown in FIG. 3, without a clamping member.

As shown in FIGS. 3 and 4, the tool holder 22, which may be manufactured from hardened steel, has a main body 26 with a holder head 28 extending away from a holder shank 30 in a forward direction F, the holder head 28 having an insert receiving pocket 32 at a forward end 34 thereof, with a pocket support surface 36 substantially facing in an upward direction U.

In some embodiments of the present invention, the holder head 28 may be rigidly fixed to the holder shank 30.

Figure 5:
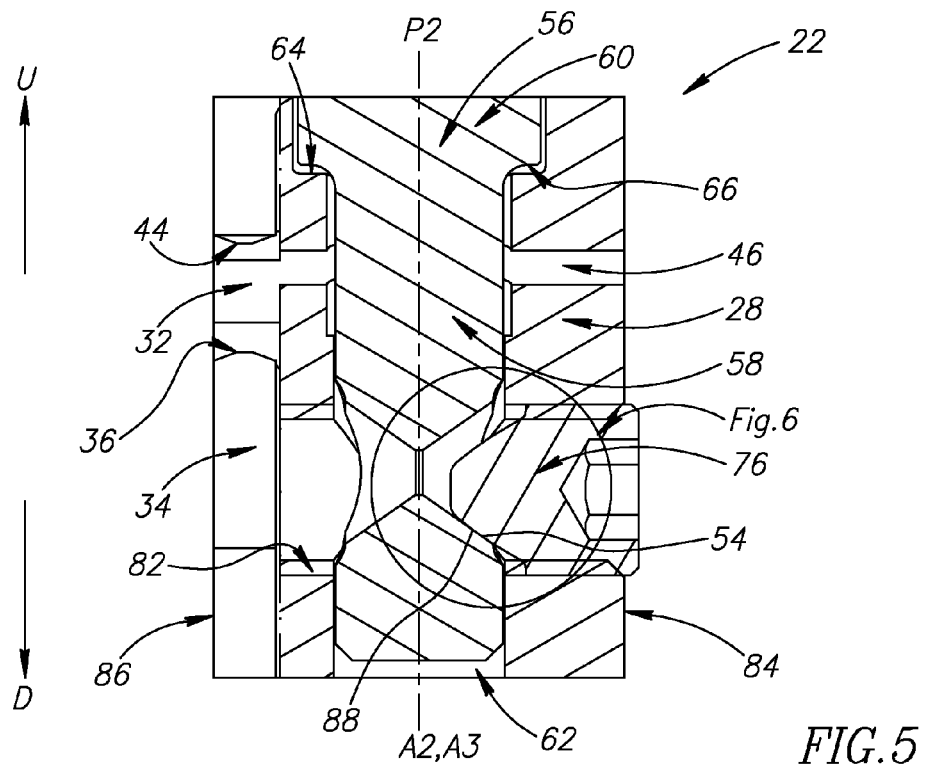
FIG. 5 is a partial cross-sectional view of the tool holder shown in FIG. 4 taken along the line V-V.

As shown in FIG. 5, the pocket support surface 36 may be generally V-shaped when viewed from a position forward of the insert receiving pocket 32.

As shown in FIGS. 1 and 2, the cutting insert 24, which may be manufactured by form press and sintering a cemented carbide, has opposing first and second insert surfaces 38, 40, with an operative cutting edge 42 associated with the first insert surface 38, and the second insert surface 40 in clamping contact with the pocket support surface 36.

The tool holder 22 is configured to direct a clamping force f towards, and clamp the cutting insert 24 against, the pocket support surface 36.

In some embodiments of the present invention, the insert receiving pocket 32 may include a pocket clamping surface 44 substantially facing in a downward direction D and making clamping contact with the first insert surface 38.

It should be understood that throughout the description and claims of the present invention, the downward direction D is generally opposite to the upward direction U, and the forward direction F is generally perpendicular to both the upward and downward directions U, D.

As shown in FIG. 3, a clamping slot 46 may divide the holder head 28 into an upper holder head portion 28a resiliently attached to a lower holder head potion 28b. The clamping slot 46 may extend away from the insert receiving pocket 32 in a rearward direction R, with the pocket support surface 36 and the pocket clamping surface 44 being separated by a slot plane P1 longitudinally bisecting the clamping slot 46.

It should be understood that throughout the description and claims of the present invention, the rearward direction R is generally opposite to the forward direction F.

In some embodiments of the present invention, the pocket clamping surface 44 may be formed on an elongated clamping jaw 48 having a resilience axis of rotation A1 adjacent a rear end 74 of the clamping slot 46, with the cutting insert 24 being actively clamped between the pocket clamping surface 44 and the pocket support surface 36.

It should be understood that throughout the description and claims of the present invention, the term "actively clamped" denotes the application of the clamping force f which has to overcome the 'resilience' of the elongated clamping jaw 48 and displace the elongated clamping jaw 48 about its resilience axis of rotation A1 before clamping of the cutting insert 24 can occur.

Also, in some embodiments of the present invention, the cutting insert 24 may be blade shaped, and suitable for grooving, turning and parting operations.

A clamping member 50 is non-threadingly retained in the holder head 28, via a top surface 29 thereof, and located entirely rearward of the pocket support surface 36.

A locking member 52 operatively engages a single abutment surface 54 of the clamping member 50, with the abutment surface 54 facing generally upwardly, the term "generally upwardly" denoting a direction having an angle of less than 45° with the upward direction U.

A method of clamping the cutting insert 24 in the tool holder 22 comprises the steps of:

positioning the cutting insert 24 adjacent the forward end 34 of the holder head 28 with a portion of the second insert surface 40 in contact with the pocket support surface 36, sliding the cutting insert 24 in the rearward direction R into the insert receiving pocket 32, and actuating the locking member 52 until the clamping force f is applied between the second insert surface 40 and the pocket support surface 36.

It should be understood that throughout the description and claims of the present invention, the term "actuating"

describes the act of initiating movement of the locking member 52 in a predetermined direction or along a predetermined path.

Figure 7:
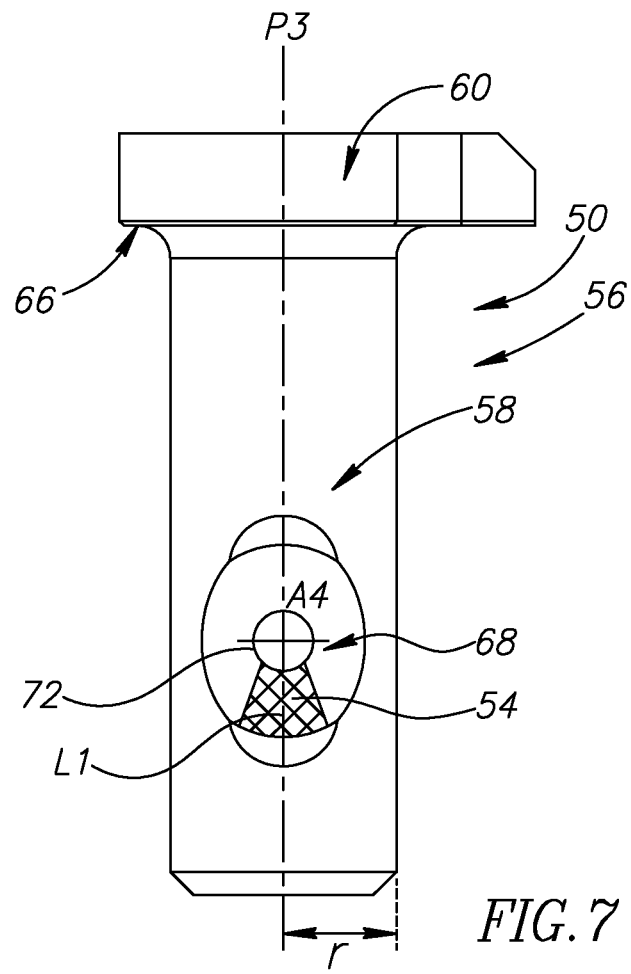
FIG. 7 is a side view of a clamping member in accordance with some embodiments of the present invention.

As shown in FIGS. 5 and 7, the clamping member 50 may be in the form of a clamping pin 56 having a pin shaft 58 and a pin head 60, with the pin shaft 58 being slidably retained in a through bore 62 in the holder head 28. Thus, holder head's through bore 62 is open to the holder head's top surface 29 and extends in a first direction transverse to the forward direction F, the through bore 62 being configured to receive the clamping member 50.

In some embodiments of the present invention, the through bore 62 may have a through bore axis A2 extending in the upward direction U.

Also, in some embodiments of the present invention, the pin shaft 58 may be cylindrical shaped having a shaft radius r, extending away from the pin head 60 along a shaft axis A3.

As shown in FIG. 5, the shaft axis A3 may be coaxial with the through bore axis A2, and the pin head 60 may be located in the elongated clamping jaw 48.

In some embodiments of the present invention, the pin head 60 may be countersunk in a jaw recess 64 of the elongated clamping jaw 48, and have a single fixed rotational position within the said jaw recess 64.

As also shown in FIG. 5, the pin head 60 may have a head under surface 66 immediately adjacent the pin shaft 58 facing in the downward direction D, and the abutment surface 54 may form a portion of a shaft recess 68 in the pin shaft 58, with the abutment surface 54 and the head under surface 66 of the pin head 60 being separated by the clamping slot 46.

The clamping pin 56 being slidably retained in the holder head 28, results in the pin head 60 having a fixed translational position relative to the elongated clamping jaw 48 when the locking member 52 is operatively engaged with the abutment surface 54, which beneficially provides a high level of clamping repeatability.

As shown in FIGS. 3 and 4, the head under surface 66 may engage the elongated clamping jaw 48 at a single clamping zone 70 located entirely forward of the through bore axis A2.

The single clamping zone 70 being located on only a portion of the jaw recess 64 around the through bore axis A2, beneficially contributes to the high level of clamping repeatability.

The single clamping zone 70 being located entirely forward of the through bore axis A2, provides optimal transmission of the clamping force f through the elongated clamping jaw 48.

Figure 6:
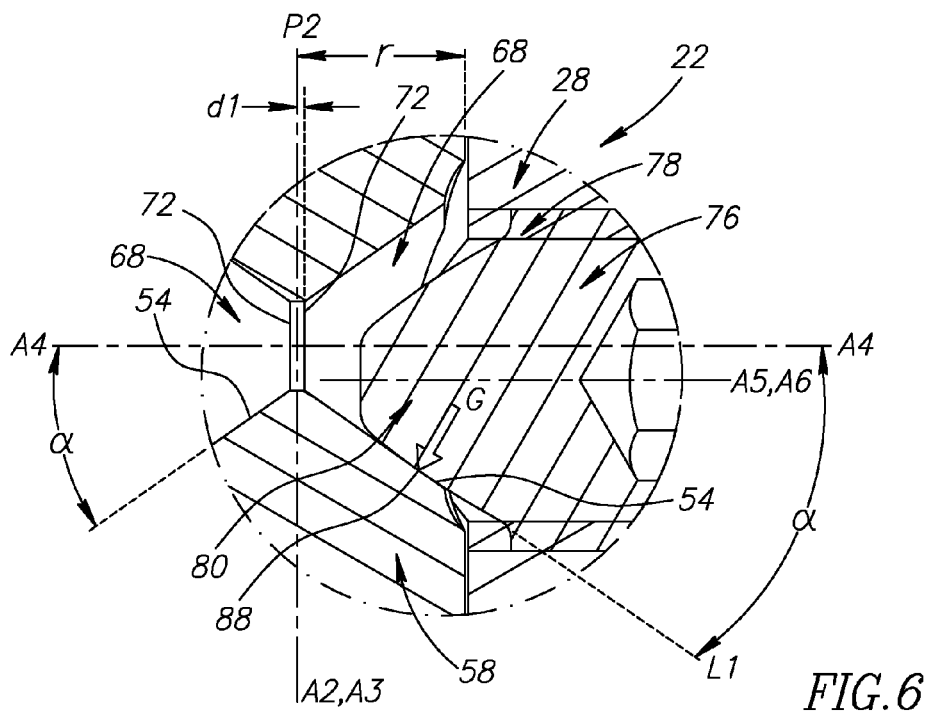
FIG. 6 is a detailed view of the tool holder shown in FIG. 5.

As shown in FIGS. 5 and 6, the abutment surface 54 may extend inwardly to an inner recess end 72 of the shaft recess 68, with the inner recess end 72 being located at a perpendicular recess distance d1 from a shaft plane P2 containing the shaft axis A3.

In some embodiments of the present invention, d1 is less than r/2, and preferably d1 is less than r/5.

Also, in some embodiments of the present invention, the pin shaft 58 may exhibit mirror symmetry about the shaft plane P2.

As shown in FIGS. 5 and 6, the shaft recess 68 may be conical shaped, extending along a recess axis A4, with the recess axis A4 intersecting the shaft axis A3.

The abutment surface 54 thus forms a concave portion of the conical shaped shaft recess 68.

In some embodiments of the present invention, the recess axis A4 may be perpendicular to the shaft axis A3, with the abutment surface 54 forming an external acute abutment angle α with the recess axis A4.

Also, in some embodiments of the present invention, the abutment angle α may be less than 45° and greater than 20°.

The recess distance d1 of the shaft recess 68 being less than r/2, and preferably less than r/5, provides an advantageously long path length for the locking member 52 to operatively engage with the abutment surface 54, which allows selection of the most suitable abutment angle α to transform the locking member 52 movement into deflection of the elongated clamping jaw 48 and achieve efficient active clamping of the cutting insert 22.

The locking member 52 may have a central axis A5, whereby rotation of the locking member 52 in one direction about its central axis A5 causes the clamping member 50 to move in the downward direction D and a decrease in a clamping distance d2 between the pocket clamping surface 44 and the pocket support surface 36 until the clamping force f is applied between the second insert surface 40 and the pocket support surface 36, and rotation of the locking member 52 in an opposite direction about its central axis A5 causes an increase in the clamping distance d2.

Figure 8:
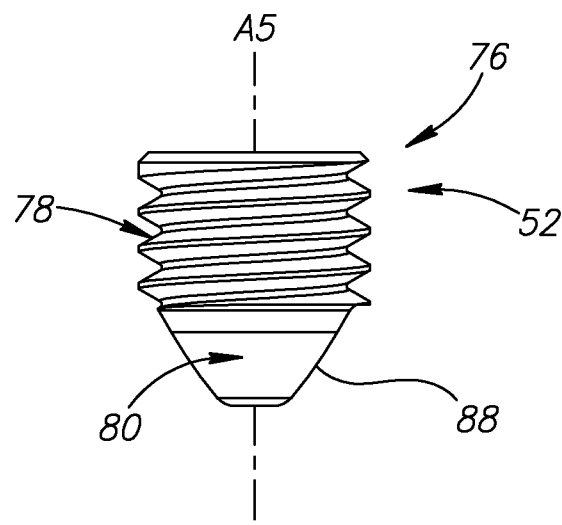
FIG. 8 is a side view of a locking member in accordance with some embodiments of the present invention.

As shown in FIG. 8, the locking member 52 may be in the form of a locking screw 76 having a threaded section 78 and a non-threaded section 80.

As shown in FIGS. 5 and 6, the threaded section 78 of the locking screw 76 may engage a screw bore 82 ("locking bore") in the holder head 28, the screw bore 82 extending towards and opening out to at least one lateral surface 84, 86 of the holder head 28 and having a screw bore axis A6 transverse to the upward direction U.

For embodiments of the present invention, where the pin shaft 58 exhibits mirror symmetry about the shaft plane P2, the screw bore 82, although 'interrupted' by the through bore 62, may extend towards and open out to opposing first and second lateral surfaces 84, 86, thus allowing the locking screw 76 to operatively engage with either of the two mirror symmetrical abutment surfaces 54 and the operator to access the locking screw 76 from either of the first and second lateral surfaces 84, 86.

Also as shown in FIGS. 5 and 6, the non-threaded section 80 of the locking screw 76 may include an abutting surface 88 having a generally frusto-conical shape, with a portion of the abutting surface 88 contacting the abutment surface 54 of the clamping member 50.

The abutting surface 88 having a generally frusto-conical shape, and the abutment surface 54 forming a concave portion of the conical shaped shaft recess 68, results in operative engagement between the abutting surface 88 and the abutment surface 54 being 'centralized' towards an imaginary line of contact L1 of the shaft recess 68, which beneficially contributes to the high level of clamping repeatability.

Thus, the locking member 52 is configured to be received into the locking bore 82 formed in the holder head's lateral surface 84, 86 and engage the clamping member's abutment surface 54 to thereby apply an abutment force G which urges the pocket clamping surface 44 in a direction of the pocket support surface 42, when the clamping member 50 is received in the holder head's top surface 29 and non-threadingly retained in the holder head 28 by said locking member 52. As such, the locking bore 82 extends in a second direction transverse to the forward direction F and intersects the through bore 62.

The imaginary line of contact L1 may be contained in a contact plane P3 perpendicular to the shaft plane P2. In some embodiments of the present invention, the abutting surface 88 may be outwardly convex in a side view of the locking screw 76, which results in an optimally short length of simultaneous contact along the imaginary line of contact L1.

What is claimed is:

1. A tool holder (22) comprising:
   a main body (26) having a holder head (28) extending away from a holder shank (30) in a forward direction (F), the holder head (28) having an insert receiving pocket (32) at a forward end (34) thereof, with a pocket support surface (36) substantially facing in an upward direction (U), the holder head further having a clamping slot (46) dividing the holder head (28) into an upper holder head portion (28a) resiliently attached to a lower holder head portion (28b);
   a clamping member (50) non-threadingly retained in the holder head (28), the clamping member (50) having a head (60) connected to a shaft (58); and
   a locking member (52) operatively engaging a single abutment surface (54) of the clamping member (50),
   wherein the clamping member's abutment surface (54) and head (60) are separated by the clamping slot (46),
   wherein the abutment surface (54) faces generally upwardly, and
   wherein the tool holder (22) is configured to direct a clamping force (f) towards, and clamp a cutting insert (24) against, the pocket support surface (36).

2. The tool holder (22) according to claim 1, wherein the clamping member (50) is in the form of a clamping pin (56) having a pin shaft (58) and a pin head (60),
   wherein the pin shaft (58) is slidably retained in a through bore (62) in the holder head (28), the through bore (62) having a through bore axis (A2).

3. The tool holder (22) according to claim 2, wherein the through bore axis (A2) extends in the upward direction (U).

4. The tool holder (22) according to claim 2, wherein the abutment surface (54) forms a portion of a shaft recess (68) in the pin shaft (58), and
   wherein the pin head (60) has a head under surface (66) immediately adjacent the pin shaft (58) facing in a downward direction (D).

5. The tool holder (22) according to claim 4, wherein the pin shaft (58) is cylindrical shaped having a shaft radius r, extending away from the pin head (60) along a shaft axis (A3).

6. The tool holder (22) according to claim 5, wherein the shaft recess (68) is conical shaped, extending along a recess axis (A4), and
   wherein the recess axis (A4) intersects the shaft axis (A3).

7. The tool holder (22) according to claim 6, wherein the recess axis (A4) is perpendicular to the shaft axis (A3), and
   wherein the abutment surface (54) forms an external acute abutment angle (cc) with the recess axis (A4).

8. The tool holder (22) according to claim 7, wherein the abutment angle (cc) is less than 45° and greater than 20°.

9. The tool holder (22) according to claim 4, wherein the insert receiving pocket (32) includes a pocket clamping surface (44) substantially facing in the downward direction (D).

10. The tool holder (22) according to claim 9, wherein the locking member (52) has a central axis (A5), and
    wherein a clamping distance d2 between the pocket clamping surface (44) and the pocket support surface (36) is decreased by rotation of the locking member (52) in one direction about its central axis (A5) and increased by rotation of the locking member (52) in an opposite direction about its central axis (A5).

11. The tool holder (22) according to claim 1, wherein the locking member (52) is in the form of a locking screw (76) having a threaded section (78) and a non-threaded section (80).

12. The tool holder (22) according to claim 11, wherein the non-threaded section (80) includes an abutting surface (88) having a generally frusto-conical shape, and
    wherein a portion of the abutting surface (88) contacts the abutment surface (54) of the clamping member (50).

13. A method of clamping a cutting insert (24) in a tool holder (22), the tool holder (22) comprising:
    a main body (26) having a holder head (28) extending away from a holder shank (30) in a forward direction (F), the holder head (28) having an insert receiving pocket (32) at a forward end (34) thereof, with a pocket support surface (36) substantially facing in an upward direction (U), the holder head further having a clamping slot (46) dividing the holder head (28) into an upper holder head portion (28a) resiliently attached to a lower holder head portion (28b);
    a clamping member (50) non-threadingly retained in the holder head (28), the clamping member (50) having a head (60) connected to a shaft (58); and
    a locking member (52) operatively engaging a single abutment surface (54) of the clamping member (50), wherein the clamping member's abutment surface (54) and head (60) are separated by the clamping slot (46), and wherein the abutment surface (54) faces generally upwardly,
    the cutting insert (24) having opposing first and second insert surfaces (38, 40) with an operative cutting edge (42) associated with the first insert surface (38),
    the method comprising the steps of:
    positioning the cutting insert (24) adjacent the forward end (34) of the holder head (28) with a portion of the second insert surface (40) in contact with the pocket support surface (36),
    sliding the cutting insert (24) in a rearward direction (R) into the insert receiving pocket (32), and
    actuating the locking member (52) until a clamping force (f) is applied between the second insert surface (40) and the pocket support surface (36).

14. The method according to claim 13, wherein the clamping member (50) is located entirely rearward of the pocket support surface (36).

15. The method according to claim 13, wherein the locking member (52) has a central axis (A5), and
    wherein rotation of the locking member (52) in one direction about its central axis (A5) causes the clamping member (50) to move in a downward direction (D) and the clamping force (f) to be applied between the second insert surface (40) and the pocket support surface (36).

16. The method according to claim 13, wherein the clamping member (50) is in the form of a clamping pin (56) having a pin shaft (58) and a pin head (60),
    wherein the pin shaft (58) is slidably retained in a through bore (62) in the holder head (28), the through bore (62) having a through bore axis (A2).

17. The method according to claim 16, wherein the abutment surface (54) forms a portion of a shaft recess (68) in the pin shaft (58), and
    wherein the pin head (60) has a head under surface (66) immediately adjacent the pin shaft (58) facing in a downward direction (D).

18. The method according to claim 17, wherein the pin shaft (58) is cylindrical shaped, extending away from the pin head (60) along a shaft axis (A3).

19. The method according to claim 18, wherein the shaft recess (68) is conical shaped, extending along a recess axis (A4), and
    wherein the recess axis (A4) intersects the shaft axis (A3).

20. The method according to claim 19, wherein the recess axis (A4) is perpendicular to the shaft axis (A3), and
wherein the abutment surface (54) forms an external acute abutment angle (cc) with the recess axis (A4).

21. The method according to claim 17, wherein the insert receiving pocket (32) includes a pocket clamping surface (44), and
wherein the pocket clamping surface (44) makes clamping contact with the first insert surface (38).

22. The method according to claim 13, wherein the locking member (52) is in the form of a locking screw (76) having a threaded section (78) and a non-threaded section (80).

23. The method according to claim 22, wherein the non-threaded section (80) includes a abutting surface (88) having a generally frusto-conical shape, and
wherein a portion of the abutting surface (88) contacts the abutment surface (54) of the clamping member (50).

24. A tool holder assembly (22) comprising:
a main body (26) having a holder head (28) extending away from a holder shank (30) in a forward direction (F), the holder head (28) having a top surface (29), at least one lateral surface (84, 86) having a locking bore (82) formed therein, a clamping slot (46) dividing the holder head (28) into an upper holder head portion (28a) resiliently attached to a lower holder head portion (28b), and an insert receiving pocket (32) at a forward end (34) thereof, the insert receiving pocket (32) comprising a pocket support surface (36) and an opposing pocket clamping surface (44);
a clamping member (50) configured to be received into the holder head (28), the clamping member having a head (60) connected to a shaft (58) and an abutment surface (54), the abutment surface (54) and head (60) being separated by the clamping slot (46); and
a locking member (52) configured to be received into the locking bore (82) formed in the holder head's lateral surface (84, 86) and engage the clamping member's abutment surface (54) to thereby apply an abutment force (G) which urges the pocket clamping surface (44) in a direction of the pocket support surface (42), when the clamping member (50) is received in the holder head's top surface (29) and non-threadingly retained in the holder head (28) by said locking member (52).

25. The tool holder assembly (22) according to claim 24, wherein:
the holder head (28) comprises a first bore (62) open to the holder head's top surface (29) and extending in a first direction transverse to the forward direction (F), the first bore (62) configured to receive the clamping member (50);
the locking bore (82) extends in a second direction transverse to the forward direction (F), the locking bore (82) intersecting the first bore (62) and configured to receive the locking member (52).

26. The tool holder assembly (22) according to claim 25, wherein:
the first bore (62) and the locking bore (82) are perpendicular to each other.

27. A cutting tool (20) comprising:
the tool holder assembly (22) according to claim 24; and
a cutting insert (24) clampingly retained in the insert receiving pocket (32) between the pocket support surface (36) and the pocket clamping surface (44); wherein:
the clamping member (50) is non-threadingly retained in the holder head (28) and
the locking member (52) occupies the locking bore (82) and engages the clamping member's abutment surface (54) to thereby apply said abutment force (G).

28. The tool holder assembly (22) according to claim 24, wherein: the clamping member (50) is located entirely rearward of the pocket support surface (36).

29. The tool holder (22) according to claim 1, wherein: the clamping member (50) is located entirely rearward of the pocket support surface (36).

* * * * *